June 7, 1938.　　G. G. GREULICH　　2,119,708
STRUCTURAL MEMBER
Filed July 25, 1936
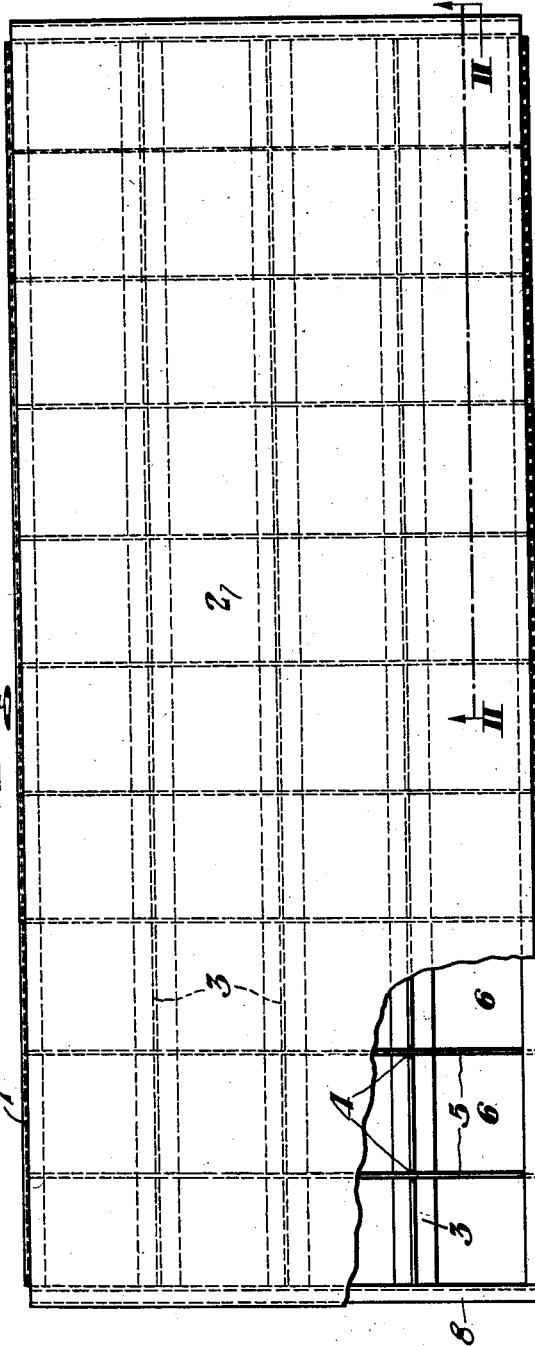
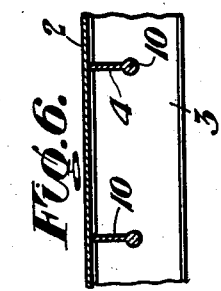
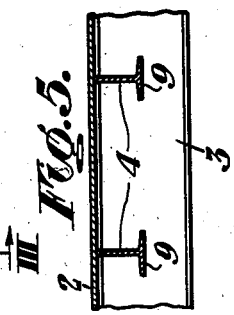
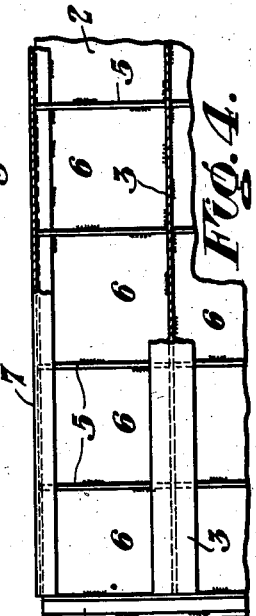
Inventor:
GERALD G. GREULICH,
by his Attorneys.

Patented June 7, 1938

2,119,708

UNITED STATES PATENT OFFICE 2,119,708

STRUCTURAL MEMBER

Gerald G. Greulich, Mount Lebanon (Pittsburgh), Pa.

Application July 25, 1936, Serial No. 92,658

1 Claim. (Cl. 189—34)

The present invention relates to a reenforced structural member adapted for bridge roadway construction, floors, roofs or the like, and particularly resides in providing a main body member with a grating understructure comprising a multiplicity of rectangular plate areas adapted to secure uniform load distribution in all directions.

Other objects and advantages will become apparent as the description proceeds in which, Figure 1 is a top plan, Figure 2 is a section on line II—II of Figure 1, Figure 3 is a section on line III—III of Figure 2, Figure 4 is a bottom plan, and Figures 5 and 6 are enlarged detailed sections similar to Figure 2 but showing other constructions of the cross-bars.

In the drawing, 2 represents a main body member comprising a solid impervious surface to which the grating or reenforcing structure is welded. The grating structure comprises a plurality of spaced longitudinal T-shaped members 3 welded to the undersurface of the main body member 2. These T-shaped members 3 are notched at spaced intervals, as indicated at 4, for receiving flat bars 5 which are positioned transversely across the T-shaped members and main body member 2 and form, on the undersurface of said main body member, a plurality of rectangular plate areas 6, the perimeters of which are rigidly attached to the main body member. The ends of the transverse flat bars 5 are connected to suitable side trimming members 7 which may be channel irons or any other structural shapes and of a width substantially equal to that of the longitudinal T-shaped members 3. The entire perimeter of the main body member is welded to the side trimming members 7 and end trimmer angle members 8, the latter also abutting the longitudinal T-shaped members 3.

As shown in Figures 5 and 6, the longitudinal T-shaped members may be provided with T-shaped or bulb bar-shaped slots for receiving T-shaped or bulb bar-shaped cross-members 9 or 10 respectively instead of the flat bars, as shown in Figure 1.

Under the present construction of providing a solid impervious main body member, the said body member assists in absorbing and uniformly distributing the stresses produced on the main body member. There is provided adequate anchorage of the perimeter of the main body member to the grating understructure to secure an equal distribution of the load in all directions of the assembled unit. These units can be made up in any length to suit the convenience of the structure to which they are applied and, if desired, the units can be bolted to each other, and in addition would have a continuous weld between the edges of adjacent plates along the sides of their top surface.

While I have shown and described specific embodiments of my invention, it will be understood that I do not wish to be limited exactly thereto, since various modifications may be made without departing from the scope of the invention as defined by the following claim.

I claim:

A reenforced structure for bridge roadway construction, floors and the like comprising a solid impervious main body member, side and end frame members extending from one surface of said main body member and welded thereto, T-shaped members extending longitudinally of said body member and welded thereto, said longitudinal T-shaped members having substantially the same height as said side frame members and adapted to abut said end frame members, T-shaped notches formed in said longitudinal T-shaped members and T-shaped cross-bars of a depth less than the depth of said longitudinal T-shaped members positioned in said notches and welded to said main body member and said side frame members, said T-shaped cross-bars extending transversely of said body member and at right angles to said longitudinal T-shaped members to form a plurality of rectangular plate areas on one side of said main body member, said rectangular areas adapted to uniformly absorb stresses transmitted by said main body member by vehicular traffic passing over said main body member.

GERALD G. GREULICH.